United States Patent
Song et al.

(10) Patent No.: US 11,486,393 B2
(45) Date of Patent: Nov. 1, 2022

(54) SCROLL COMPRESSOR FOR VEHICLE

(71) Applicant: SHANGHAI HIGHLY NEW ENERGY TECHNOLOGY CO., LTD., Shanghai (CN)

(72) Inventors: Xuefeng Song, Shanghai (CN); Yuqiang Wang, Shanghai (CN)

(73) Assignee: SHANGHAI HIGHLY NEW ENERGY TECHNOLOGY CO., LTD., Shanghai (CN)

( * ) Notice: Subject to any disclaimer, the term of this patent is extended or adjusted under 35 U.S.C. 154(b) by 404 days.

(21) Appl. No.: 16/608,277

(22) PCT Filed: Mar. 7, 2018

(86) PCT No.: PCT/CN2018/078341
§ 371 (c)(1),
(2) Date: Dec. 19, 2019

(87) PCT Pub. No.: WO2018/196489
PCT Pub. Date: Nov. 1, 2018

(65) Prior Publication Data
US 2020/0124048 A1    Apr. 23, 2020

(30) Foreign Application Priority Data
Apr. 28, 2017  (CN) .......................... 201710295698.8

(51) Int. Cl.
*F04C 18/02*   (2006.01)
*F04C 29/00*   (2006.01)

(52) U.S. Cl.
CPC ...... *F04C 18/0215* (2013.01); *F04C 29/0085* (2013.01); *F04C 2230/60* (2013.01); *F04C 2240/40* (2013.01); *F04C 2240/803* (2013.01)

(58) Field of Classification Search
CPC .............. F04C 2230/60; F04C 2240/40; F04C 2240/803; H02K 5/225; H02K 11/33; F04B 39/14; H01R 13/521
See application file for complete search history.

(56) References Cited

U.S. PATENT DOCUMENTS

| | | | |
|---|---|---|---|
| 2008/0214415 | A1 | 9/2008 | Ohkawa et al. |
| 2011/0243769 | A1* | 10/2011 | Yamada ............... H01R 13/521 |
| | | | 417/410.1 |
| 2017/0040864 | A1 | 2/2017 | Takabe |

FOREIGN PATENT DOCUMENTS

| | | |
|---|---|---|
| CN | 1242477 A | 1/2000 |
| CN | 1407233 A | 4/2003 |

(Continued)

OTHER PUBLICATIONS

Kobayashi, "JP05052288U_MT.pdf" (Machine Translation) (Year: 1993).*

(Continued)

*Primary Examiner* — Kenneth J Hansen
(74) *Attorney, Agent, or Firm* — Qinghong Xu

(57) ABSTRACT

A scroll compressor of vehicles includes a housing including a first opening to form a receiving space, a compressing mechanism, and an electrical machinery mechanism including a rotor and a stator. The electrical machinery mechanism, located in the receiving space, drives the compressing mechanism to rotates. A lower holder is fixed to an upper holder via the stator. The stator is coupled to a binding post by lead-out wires, and the binding post, away from a bottom wall of the housing, is located between an inner wall of the housing and an outer wall of the stator. The stator and the binding post are directly or indirectly installed to a same component, and a distance between an outlet of the lead-out (Continued)

wires and the binding post is constant during the assembling process of the binding post and the lead-out wires.

12 Claims, 22 Drawing Sheets

(56) References Cited

FOREIGN PATENT DOCUMENTS

| CN | 1407237 | A | 4/2003 |
|---|---|---|---|
| CN | 102132042 | A | 7/2011 |
| CN | 102686881 | A | 9/2012 |
| CN | 203463290 | U | 3/2014 |
| CN | 104989650 | A | 10/2015 |
| CN | 106930941 | A | 7/2017 |
| CN | 106968948 | A | 7/2017 |
| CN | 107013460 | A | 8/2017 |
| CN | 107013463 | A | 8/2017 |
| CN | 107023482 | A | 8/2017 |
| CN | 107100845 | A | 8/2017 |
| CN | 107100846 | A | 8/2017 |
| CN | 206889251 | U | 1/2018 |
| CN | 206889252 | U | 1/2018 |
| JP | H0311188 | A | 1/1991 |
| JP | H04255568 | A | 9/1992 |
| JP | H0552288 | U | 7/1993 |
| JP | H06307374 | A | 11/1994 |
| JP | H1122660 | A | 1/1999 |
| JP | 2002295378 | A | 10/2002 |
| JP | 2003065256 | A | 3/2003 |
| JP | 2003074480 | A | 3/2003 |
| JP | 2004251161 | A | 9/2004 |
| JP | 2011069311 | A | 4/2011 |
| WO | 9317239 | A1 | 9/1993 |

OTHER PUBLICATIONS

The EESR issued Nov. 6, 2020 by the EPO.
The ISR issued May 25, 2018 by the WIPO.
The CN1OA issued Mar. 5, 2019 by the CNIPA.
The JP1OA issued Sep. 15, 2020 by the JPO.
Notice of Reasons for Refusal dated Mar. 8, 2022 of Japan Patent Application No. 2020-509143.

* cited by examiner

SCROLL COMPRESSOR FOR VEHICLE

CROSS-REFERENCE TO RELATED APPLICATIONS

This application is a continuing application of International Application No. PCT/CN2018/078341, filed on Mar. 7, 2018 which is based upon and claims priority to Chinese Patent Application 201710295698.8, filed on Apr. 28, 2017, the entire contents of which are incorporated herein by reference.

TECHNICAL FIELD

The present disclosure relates to the field of compressors, and more particularly, to a scroll compressor of vehicles.

BACKGROUND

The present compressors with binding posts coupled to stators via lead-out wires have characters and disadvantage presented in the followings.

1) A stator of most compressors is assembled into a housing by an interference fit and lead-out wires are then coupled to binding posts installed to the housings or housing covers. The coupling processes are necessary to be accomplished before housings and housing covers form closed chambers. In the current compressor, a binding post is installed to a housing cover. Thus, after the assembling of a lead-out wire and the binding post is accomplished and a closed chamber is formed the housing and the housing cover, the lead-out wire must include redundant length. Otherwise, the assembling of the lead-out wire and the binding post cannot be proceeded before the compressing chamber of the compressor is closed. Due to the vibration caused by an operating compressor, the redundant length of the lead-out wire possibly contacts nearby metal components. Electric leakage is then caused once the protecting insulation layer of the lead-out wire is broken. The exposed wire, contacted the metal components, is not good for the insulation and reliability of compressors. A binding host is assumed to be installed, taking certain operating space, on the housing, with a lead-out wire assembled with the binding host. The assembly and examining are inconvenient if the space of the housing is compact. The compressor is difficult to be miniaturized if the operating space is reserved in the housing. Thus, the structure with a stator assembled, by an interference, in housing includes the above disadvantages.

2) Binding posts of most current compressors are installed outside of the compressor. Since a binding post is installed outside of a compressor, with the internal pressure being higher than the external pressure of the compressor, the pressure difference between the internal pressure and the external pressure forces the end cover bearing the binding post to have a tendency to depart from the corresponding installing surface. Therefore, it is not good for the sealing between the end cover bearing a binding post and the housing. Moreover, the pressure difference between the internal pressure and the external pressure of the compressor applies on the fastener of the binding post. The fastener is then loaded with great pressure. Except overcoming the pressure difference between the internal pressure and the external pressure of the compressor, a certain pressure has to be applied on the corresponding installing surface, being installed with the binding post, to implement tight sealing. This assembling way has high strength demanding on the binding post and the fastener which is not good to light-weighting and low-costing in producing compressors.

3) in a compressor, at the joints of the binding post and lead-out wires, a portion of the pins of the binding post may be exposed in an environment which includes refrigerant, lubricant oil, water and impurity. Since With the poor insulation of the refrigerant, water and impurity do not have good insulation, the exposed portion of the pins of the binding post may lead to worse insulation of the joints of the binding post and the lead-out wires.

4) After the air conditioning system is filled more refrigerant or the compressor stops operating, some liquid refrigerant mixed with lubricant oil, water and impurities possibly flow into the low-pressure chamber of the compressor. The insulation of the compressor will be downgraded when the joints of a binding post and a lead-out wire are soaked into the liquid refrigerant.

SUMMARY

In the present disclosure, a scroll compressor of vehicles is provided to overcome the mentioned disadvantages. The binding hosts of the scroll compressor of vehicles of the present disclosure are easier to assemble, In embodiments of the present disclosure, a scroll compressor of vehicles is provided. The scroll compressor includes a housing including a receiving space; a compressing mechanism; an electrical machinery mechanism located in the receiving space, including a motor and a stator, wherein the electrical machinery mechanism is located in the receiving space; an upper holder; and a lower holder being fixed to the upper holder via the stator, wherein the stator is coupled to the binding post by lead-out wires and the binding post, away form a bottom wall of the housing, are located between an inner wall of the housing and an outer wall of the stator, wherein the stator and the binding post are directly or indirectly installed to a same component, and a distance between an outlet of the lead-out wires and the binding post is constant. The assembling of an assembly including the binding post and the lead-out wire is accomplished before a closer chamber is formed between the housing and the assembly.

In embodiments of the present disclosure, a scroll compressor of vehicles is provided. The scroll compressor includes a housing including a receiving space; a compressing mechanism; an electrical machinery mechanism located in the receiving space, including a motor and a stator, wherein the electrical machinery mechanism is located in the receiving space; an upper holder; and a lower holder being fixed to the upper holder via the stator, wherein the stator is coupled to the binding post by lead-out wires and the binding post, away form a bottom wall of the housing, are located between an inner wall of the housing and an outer wall of the stator, wherein the stator and the binding post are directly or indirectly installed to a same component, and a distance between an outlet of the lead-out wires and the binding post is constant. The assembling of an assembly including the binding post and the lead-out wire is accomplished before a closer chamber is formed between the housing and the assembly. The housing comprises a retaining wall which divides the receiving space to a low-pressure chamber and a controller chamber, wherein the electrical machinery mechanism is disposed in the low-pressure chamber.

In embodiments of the present disclosure, a scroll compressor of vehicles is provided. The scroll compressor includes a housing including a receiving space; a compressing mechanism; an electrical machinery mechanism located in the receiving space, including a motor and a stator, wherein the electrical machinery mechanism is located in the receiving space; an upper holder; and a lower holder being fixed to the upper holder via the stator, wherein the stator is coupled to the binding post by lead-out wires and the binding post, away form a bottom wall of the housing, are located between an inner wall of the housing and an outer wall of the stator, wherein the stator and the binding post are directly or indirectly installed to a same component, and a distance between an outlet of the lead-out wires and the binding post is constant. The assembling of an assembly including the binding post and the lead-out wire is accomplished before a closer chamber is formed between the housing and the assembly. The same component includes the fixed scroll plate or the case housing cover, and a close cavity is formed between the same component and the housing.

BRIEF DESCRIPTION OF THE DRAWINGS

The accompanying drawings, which are incorporated in and constitute a part of this specification, illustrate embodiments consistent with the invention and, together with the description, serve to explain the principles and advantages of the invention.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims.

A compressor, a scroll compressor of vehicles, is disclosed to overcome the disadvantages of the prior art. Each of the following exemplary embodiments illustrates a compressor including a vertical structure, the shaft transmission mechanism is vertically disposed along the axis of the scroll pump body, which is not limited therein. In some embodiments, the compressor disclosed in the present disclosure is used in an electric automobile, but is not limited therein.

Figure 1:
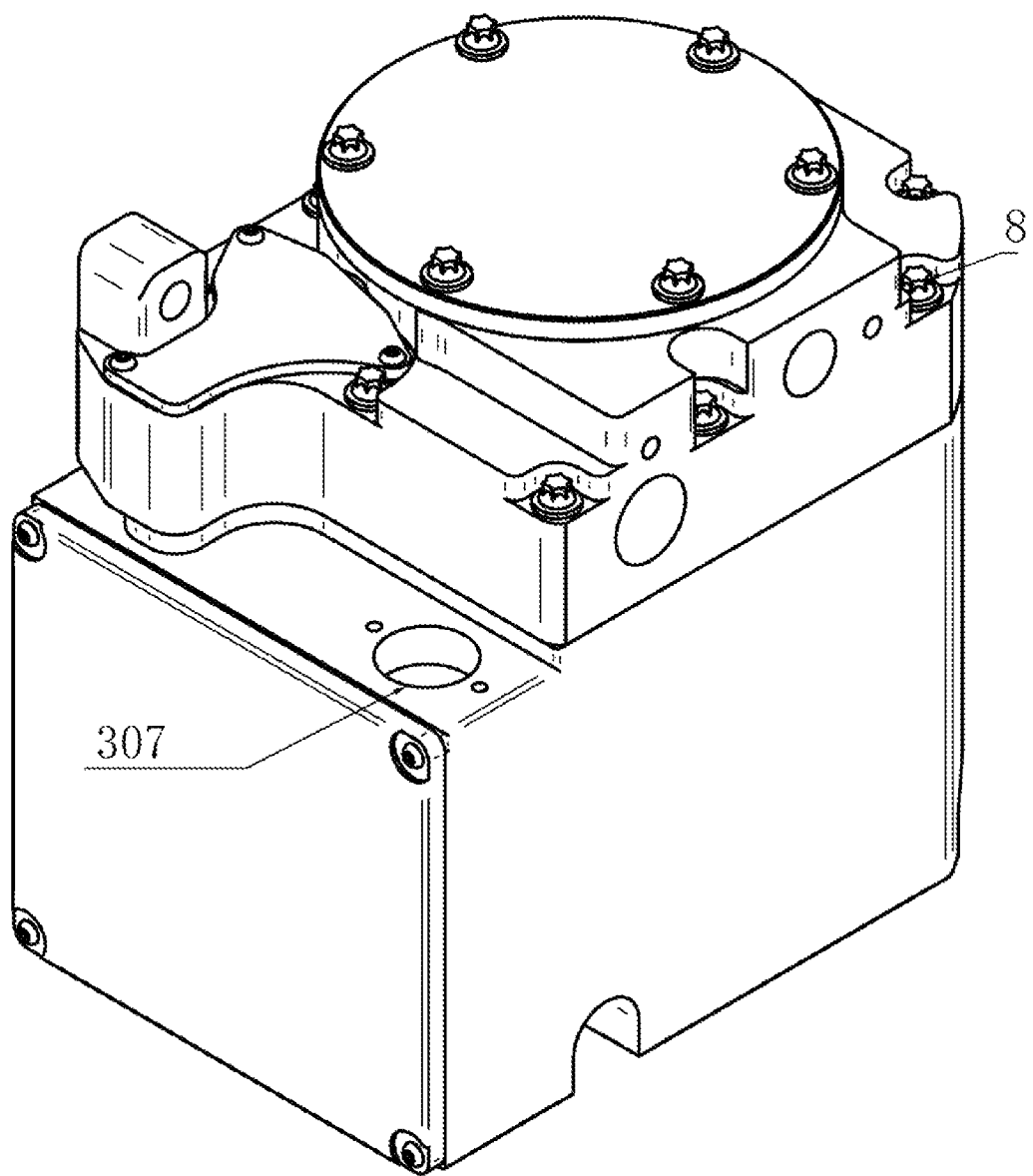
FIG. 1 is a three-dimensional view of a compressor of the present disclosure, according to an exemplary embodiment.
Figure 2:
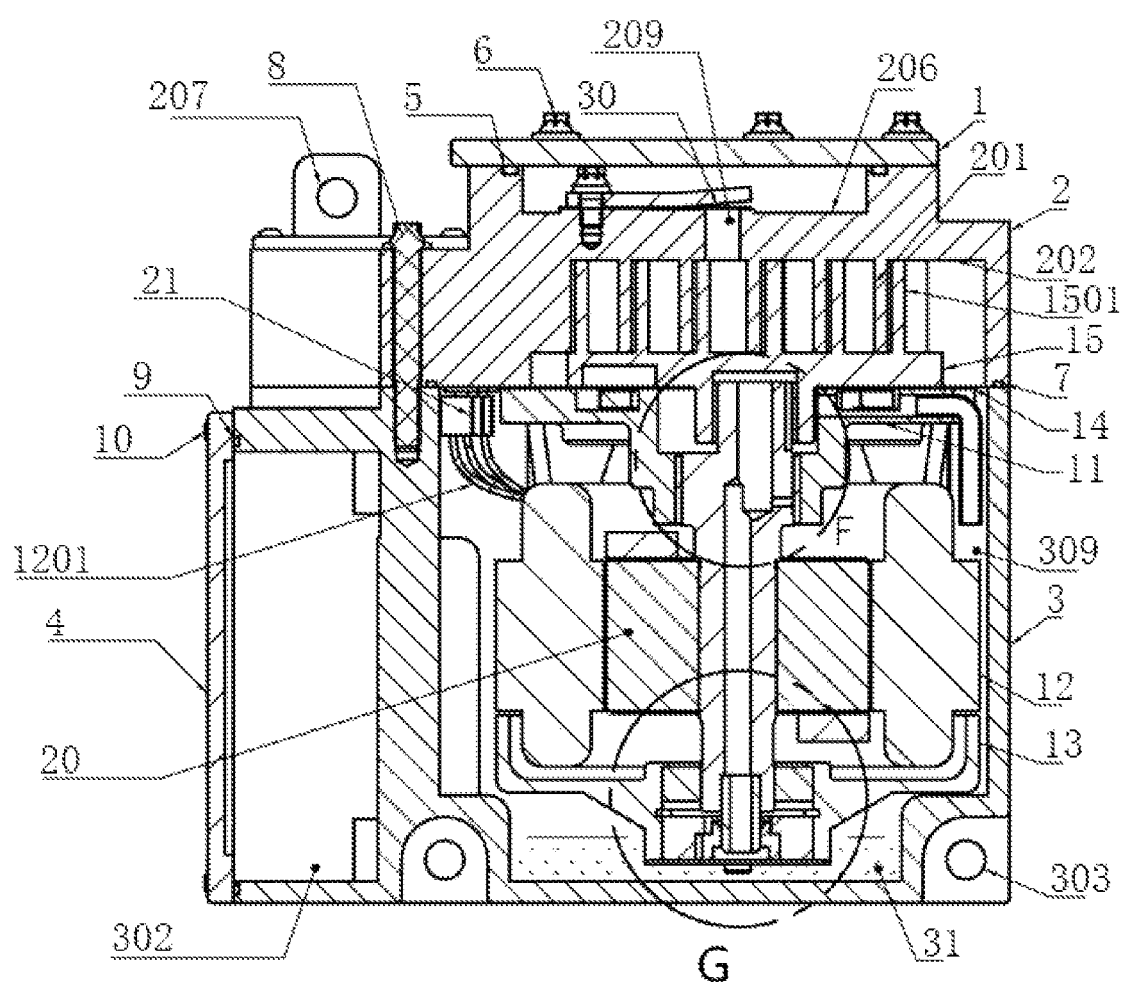
FIG. 2 is a cross-sectional view of a compressor of the present disclosure, according to an exemplary embodiment.
Figure 3:
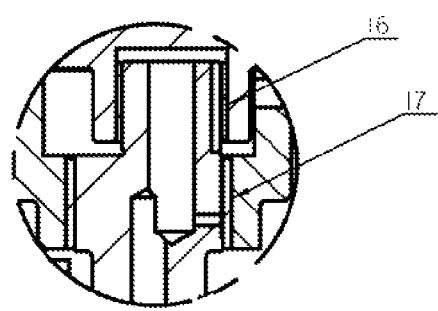
FIG. 3 is a partial view F of FIG. 2.
Figure 4:
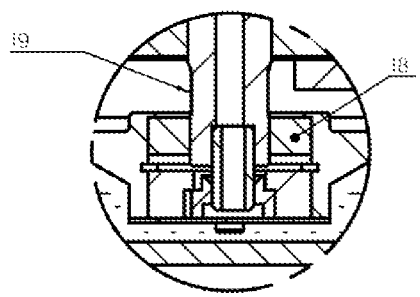
FIG. 4 is a partial view G of FIG. 2.
Figure 5:
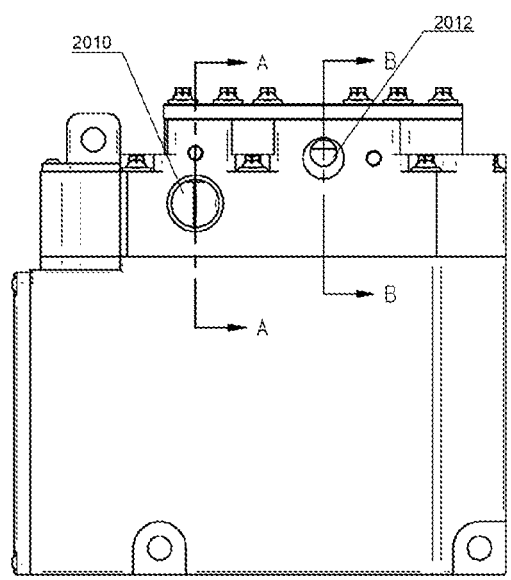
FIG. 5 is a schematic view of a compressor of the present disclosure, according to an exemplary embodiment.
Figure 6:
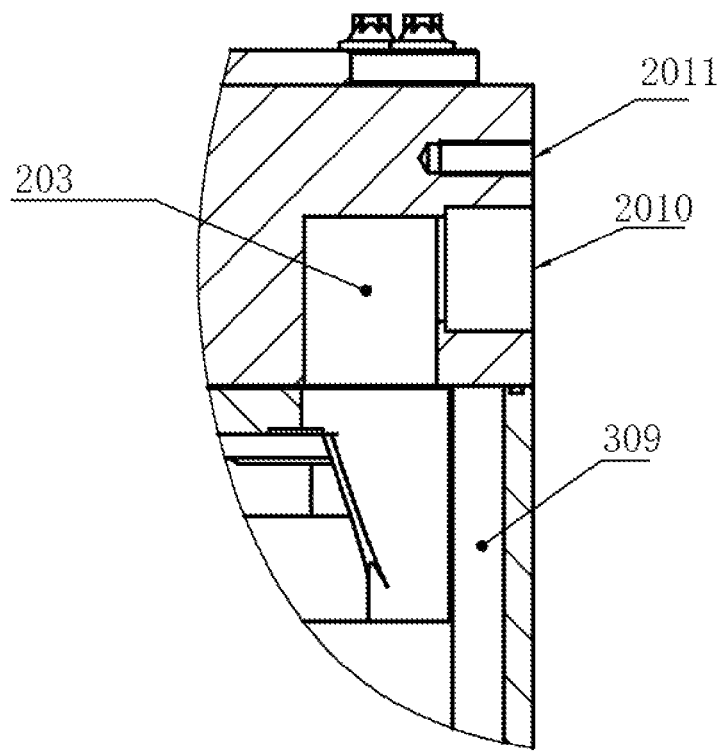
FIG. 6 is a cross-sectional view along line A-A of FIG. 5.
Figure 7:
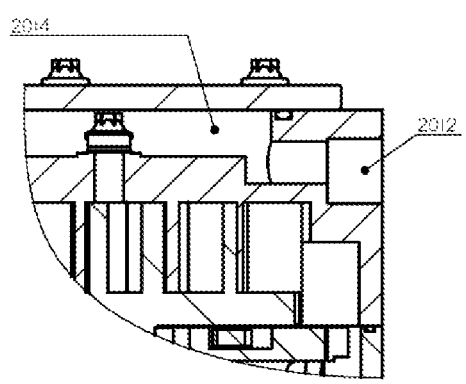
FIG. 7 is a cross-sectional view along line B-B of FIG. 5.
Figure 8:
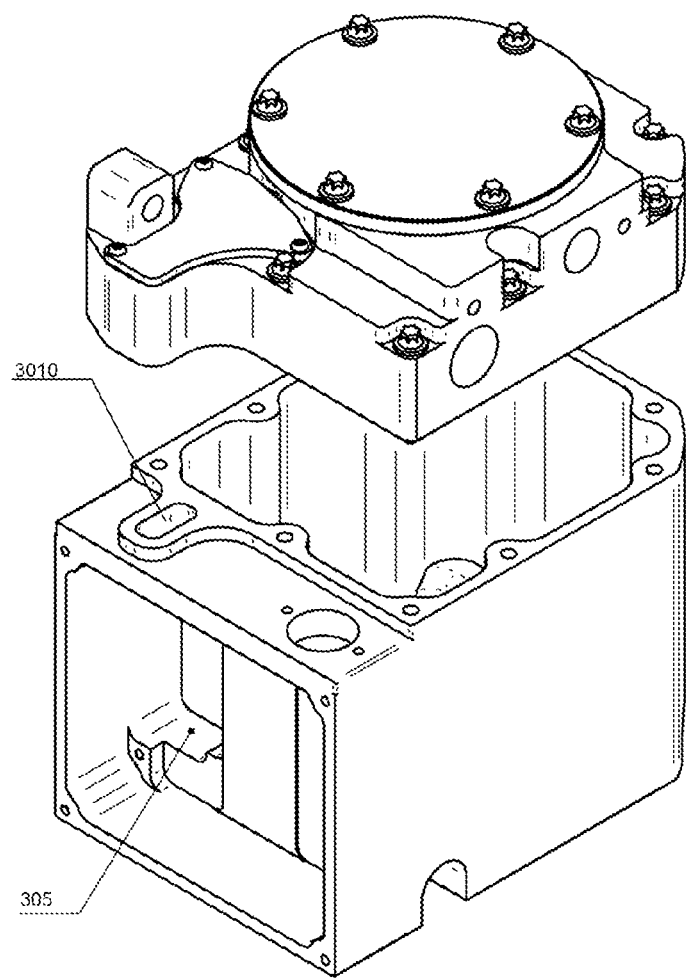
FIG. 8 is an explosion view of a compressor housing of the present disclosure, according to an exemplary embodiment.
Figure 9:
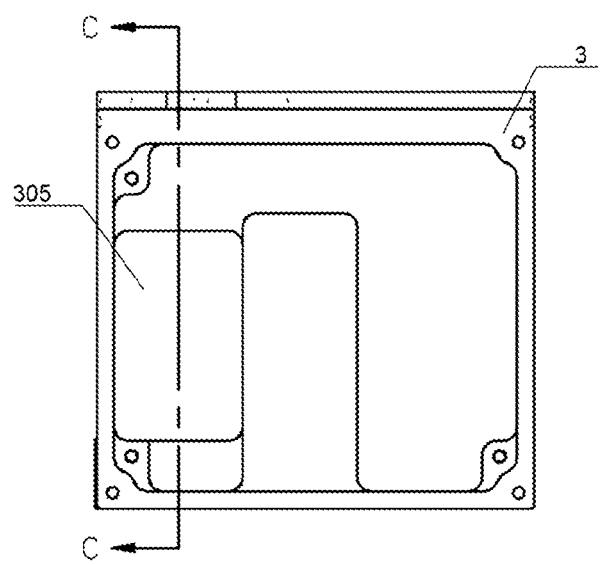
FIG. 9 is a cross-sectional view of a compressor housing of the present disclosure, according to an exemplary embodiment.
Figure 10:
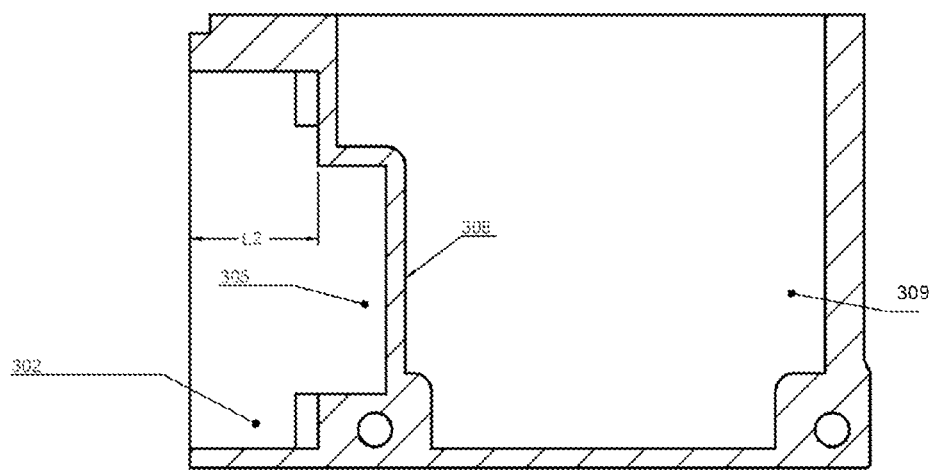
FIG. 10 is a cross-sectional view along line C-C of FIG. 9.
Figure 11:
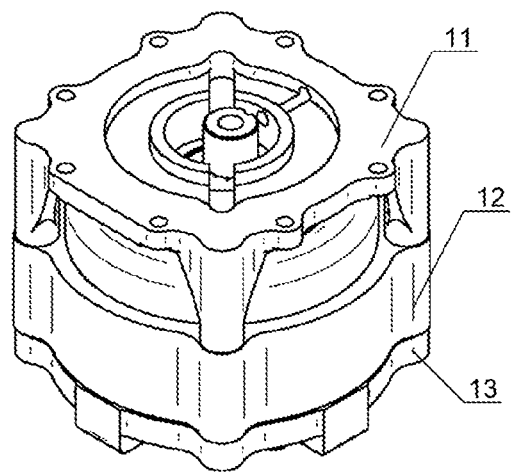
FIG. 11 is a three-dimensional view of an upper-holder, an electrical machinery mechanism and a lower holder, according to an exemplary embodiment.
Figure 12:
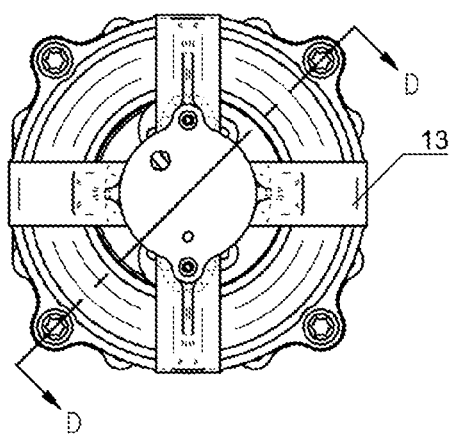
FIG. 12 is a bottom view of an upper holder, an electrical machinery mechanism and a lower holder, according to an exemplary embodiment.
Figure 13:
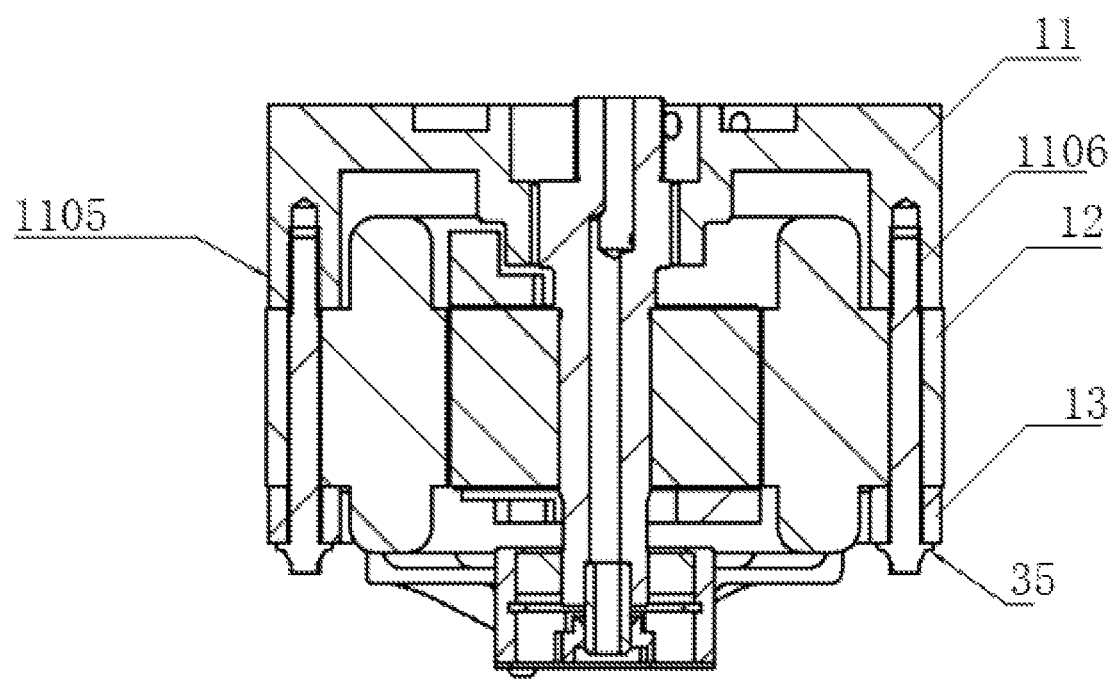
FIG. 13 is a cross-sectional view along line D-D of FIG. 12.
Figure 14:
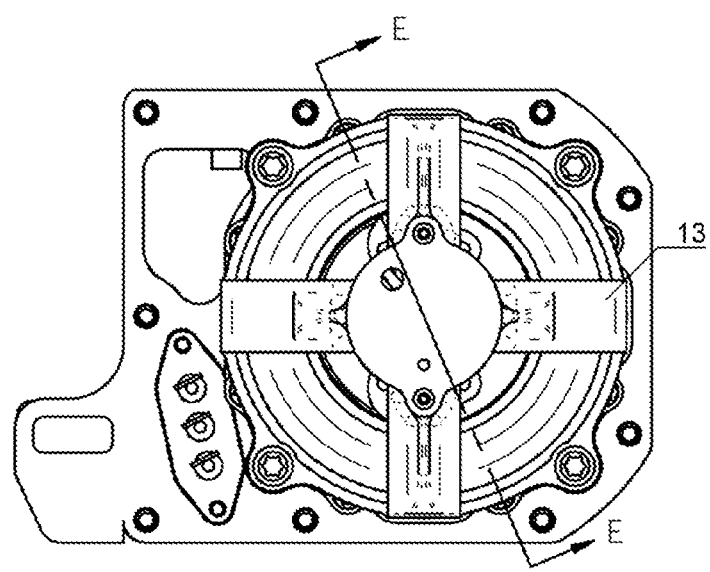
FIG. 14 is a bottom view of interior of the housing of a compressor of the present disclosure, according to an exemplary embodiment.
Figure 15:
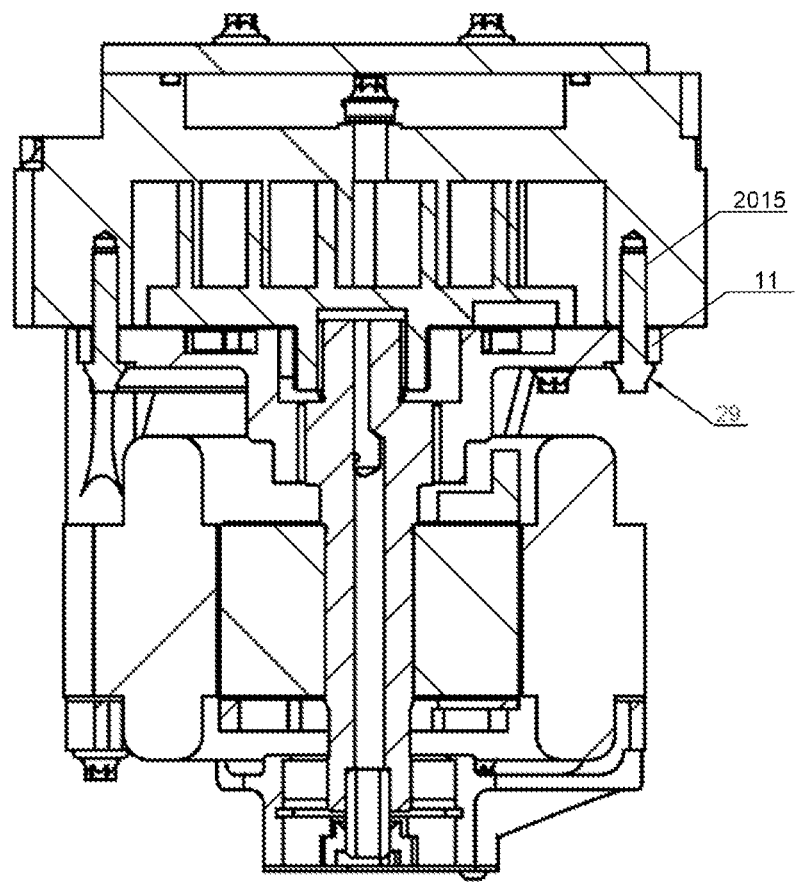
FIG. 15 is a cross-sectional view along line E-E of FIG. 14.
Figure 16:
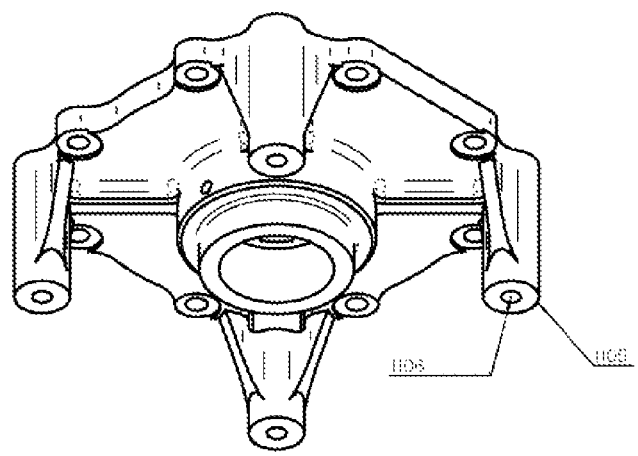
FIG. 16 is a three-dimensional view of an upper holder, according to an exemplary embodiment.

In one embodiment of the present invention is presented first according to FIGS. 1 to 16. FIG. 1 is a three-dimensional view of a compressor of the invention, according to an exemplary embodiment. FIG. 2 is a cross-sectional view of a compressor of the disclosure, according to an exemplary embodiment. FIG. 3 is a partial view F of FIG. 2. FIG. 4 is a partial view G of FIG. 2. FIG. 5 is a schematic view of a compressor of the disclosure, according to an exemplary embodiment. FIG. 6 is a cross-sectional view along line A-A of FIG. 5. FIG. 7 is a cross-sectional view along line B-B of FIG. 5. FIG. 8 is an explosion view of a compressor housing of the disclosure, according to an exemplary embodiment. FIG. 9 is a schematic view of a compressor housing of the disclosure, according to an exemplary embodiment. FIG: 10 is a cross-sectional view along line C-C of FIG. 9. FIG. 11 is a three-dimensional view of an upper-holder, an electrical machinery mechanism and a lower holder, according to an exemplary embodiment. FIG. 12 is a bottom view of an upper holder, an electrical machinery mechanism and a lower holder, according to an exemplary embodiment. FIG. 13 is a cross-sectional view line D-D of FIG. 12. FIG: 14 is a bottom view from inside the housing of a compressor of the disclosure, according to an exemplary embodiment. FIG. 15 is a cross-sectional view along line E-E of FIG. 14. FIG. 16 is a three-dimensional view of an upper holder, according to an exemplary embodiment.

In this embodiment, the vertical compressor includes a housing 3, a compressing mechanism including a fixed scroll plate 2, an orbiting scroll plate 15, and an electrical machinery mechanism. In some embodiments, the vertical compressor further includes an upper cover 1.

The housing 3 includes a first opening. In some embodiments, the housing 3 is a casting. The housing 3 includes a retaining wall 308 for dividing a receiving space to a low-pressure chamber 309 and a controller chamber 302. Moreover, the vertical compressor includes a controller-chamber cover 4 for sealing a second opening, and electric controlling components. In some embodiments, the controller-chamber 4 and the housing 3 are fastened and sealed via a sealing ring 9 (or a sealing pad, or sealing glue) and bolts 10. The electric controlling components are disposed, between the controller-chamber cover 4 and the retaining wall, in the controller chamber 302. In some embodiments, the retaining wall 308 includes a reentrant 305 facing an opening of the controller chamber. The electric controlling components include a first electric controlling component and a second electric controlling component. The first electric controlling component is disposed in the reentrant 305. The first electric controlling component includes, but not limited thereto, at least one of capacitors, inductors and relays. The second electric controlling component is patched with a portion of the retaining wall 308, wherein the portion of retaining wall 308 is outside of the reentrant 305. The second controlling component includes power components. In some embodiments, the location of the reentrant 305 is at a side of the low-pressure chamber 309 without interfering with the internal components of the low-pressure chamber 309. At a side of the controller chamber 302, the power component is patched with a portion of the retaining wall 308, wherein the portion of the retaining wall 308 is disposed outside of the reentrant 305. In the low-pressure chamber, the refrigerant, coining through the suction chamber 203, flows by the retaining wall 308, and the heat, generated by the power components, is absorbed by the refrigerant.

In this way, the surplus space in the low-pressure chamber 309 is divided, by the retaining wall 308, for receiving electrical controlling components, and the width L2 of the controller chamber 302 is then reduced, and the size of the vertical scroll compressor is minimized. In some embodiments, the remaining second electrical controlling components which are not disposed in the reentrant 305 may be not be patched with the retaining wall 308.

The fixed scroll plate 2 includes a low-pressure side 202 of scroll wraps 201 and a high-pressure side 206, opposite to the scroll wraps 201. The low pressure side 202 of the fixed scroll plate 2 is facing towards the first opening of the housing 3 to form a receiving space. In some embodiments, the shape of the receiving space, formed between the housing 3 and the low pressure side of the fixed scroll plate 2, is similar to a cuboid. It should be noticed that, in some embodiments, the receiving space is also a cylindrical or a cubic. The housing 3 and the fixed scroll plate 2, in some embodiments, are fastened and sealed by a sealing ring 7 (or a sealing pad, or sealing glue) and bolts 8. The fixed scroll plate is made of aluminum alloy with characters of abrasion-resistant and high-strength, e.g. forged aluminum alloy or extrusion casted aluminum alloy, wherein the material strength and compactness of a component made of aluminum alloy with a high-strength character are superior to the material strength and compactness of a common casting one. In some embodiments, at least one of the installation feet 207, 303 is disposed on the fixed scroll plate 2 and the housing 3 to install the compressor in an automobile.

A high-pressure chamber 2014 is formed between the upper cover 1 and the high-pressure side 206 of the fixed scroll plate 2. An exhaust valve 30 and an exhaust baffle are installed in the high-pressure chamber 2014. In some embodiments, the upper cover 1 and the fixed scroll plate 2 are fastened and sealed by a sealing ring 5 (or a sealing pad, or sealing glue) and bolts 6. A suction chamber 203 is formed on the low-pressure side 202 of the fixed scroll plate 2. The fixed scroll plate 2 includes an exhaust port 2012 connecting the high-pressure chamber 2014 and a suction port 2010 connecting the suction chamber 203. The fixed scroll plate 2 further includes a threaded hole 2011. The suction chamber 203 is connected to the suction port 2010.

In another word, the fixed scroll plate 2, made of high-strength aluminum alloy, acts as a portion of the housing of the compressor, and the fixed scroll plate 2 includes both of the suction port 2010 and the exhaust port 2012. Since strength and compactness of a component made of high-strength aluminum alloy, e.g. forged aluminum alloy or extrusion casted aluminum alloy, is superior to strength and compactness of a common cast component, the airtightness and thread strengths of the suction port 2010 and the exhaust port 2012 are improved. In the meantime, since the housing 3, produced by casting process, includes less portions and areas being produced by machining process, the airtightness of the housing 3 is improved and the airtightness of the compressor is improved as well.

The orbiting scroll plate 15 is located in the receiving space, and a side, including scroll wraps 1501, of the orbiting scroll plate 15 is faced towards the low-pressure side of the fixed scroll plate 2. A compression chamber is formed between the scroll wraps 201 of the fixed scroll plate 2 and the scroll wraps 1501 of the orbiting scroll plate 15.

The electrical machinery mechanism, located in the low-pressure chamber 309 in the receiving space, includes a rotor 20 and a stator 12, and drives the orbiting scroll plate 15 to rotate relative to the fixed scroll plate 2, compressing refrigerant in the compression chamber.

In some embodiments, the pathway of the refrigerant of the compressor is the following. The refrigerant enters the suction chamber 203, connected to the low-pressure chamber 309, through the suction port 2010. The refrigerant flows into the low-pressure side 202 of the fixed scroll plate 2 via the low-pressure chamber 309, and then the refrigerant flows into the compression chamber, formed between the scroll wraps 201 of the fixed scroll plate and the scroll wraps 1501 of the orbiting scroll plate, to be compressed. The compressed refrigerant flows into the high-pressure chamber 2014 via the outlet 209, and then the compressed refrigerant flows into the exhaust port 2012 connected to the high-pressure chamber 2014.

Furthermore, the refrigerant flows into the vertical compressor via the suction port 2010 of the fixed scroll plate 2, and then flows away the fixed scroll plate and towards the bottom wall of the housing 3. The refrigerant flows by the retaining wall 308 of the housing 3 and cools down electrical controlling components inside the controller chamber 302. The refrigerant also flows by the electrical machinery mechanism to cool down the electrical machinery mechanism. The refrigerant then flows into the compression chamber formed between the static and fixed scroll plate 2 and the orbiting scroll plate 15.

As mentioned above, in some embodiments of the present disclosure, a compressor includes a vertical structure. Since the shape of the receiving space, located inside the housing, is similar to a cuboid, the length of the overall compressor is shorter than the length of a horizontal compressor but the height of the compressors is the same. Therefore, the compressor occupies less horizontal space for installation, and a stable oil pool 31 is formed at the bottom of the low-pressure chamber 309 of the compressor, such that the target of better lubrication performance is achieved. Thus, the reliability of the compressor is improved and the oil consumption is reduced. Moreover, when solid impurity enters the compressor via the suction port 2010 and the suction chamber 203, the solid impurity is deposited on the bottom of the low-pressure chamber 309, thus, there is minor chance for solid impurity entering into the compressing chamber formed between the fixed scroll plate 2 and the orbiting scroll plate 15. Thus, the risk of damages, caused by the solid impurity, of the pump body is then reduced.

In some embodiments, the compressor further includes an upper holder 11 and a lower holder 13. Each of the upper holder 11 and the lower holder 13 includes a through hole which allows the shaft-bearing mechanisms to go through.

The upper holder 11 is connected and fixed to the low-pressure side 202 of the fixed scroll plate 2. In some embodiments, bolts 29 go through the through hole of the upper holder 11 and a threaded hole 2015 of the fixed scroll plate 2, which allows the low-pressure side 202 of the fixed scroll plate 2 connect and fix the upper holder 11.

The lower holder 13 is connected and fixed to the upper holder 11 via the stator 12. More specifically, in this embodiment, the upper holder 11 includes a first side connected and fixed to the fixed scroll plate 2, and a second side opposite to the first side. A plurality of upper-holder bosses 1105 is disposed on the second side of the upper holder 11. Each of the upper-holder bosses 1105 includes a threaded hole 1106. The stator 12 includes a plurality of first bolt-through holes corresponding to the threaded holes 1106. The lower holder 13 includes a plurality of second bolt-through holes corresponding to the threaded holes 1106. Bolts 35 go through the second bolt-through holes, the first bolt-through holes and the threaded holes 1106 for fixing the upper holder 11, the stator 12 and the lower holder 13. The upper holder 11, the stator 12 and the lower holder 13 are hung on the low-pressure side of the fixed scroll plate 2 and do not contact the housing 3.

The upper holder 11, the stator 12 and the lower holder 13 are fixed and then hung on the fixed scroll plate 2, and the upper holder 11, the stator 12 and the lower holder 13 do not contact the housing 3. Thus, vibration and noise of the electrical motor and transmission mechanisms are avoided to be conducted via the housing 3 and vibration and noise of the overall compressor are reduced. Since the interference fit of the stator 12 and the housing 3 is eliminated, precision requirements for the housing 3 and the stator 12 are lowered down which reduces production costs. Moreover, the connection structure provides visual examinations when the parts inside the compressor are assembled. Thus, faulty operation in assembling is then avoided. Therefore, the ways of producing and assembling the parts of the compressor are optimized by the connection structure and the production cost is reduced as well.

The orbiting scroll plate 15, in some embodiments, includes a shaft-bearing hole on a side opposite to the fixed scroll plate 2. A dynamic-vortex-plate bearing 16 is disposed in the shaft-bearing hole. An abrasion resistant pad 14 is located between the upper holder 11 and the orbiting scroll plate 15. In some embodiments, the compressor includes an upper bearing 17 and a lower bearing 18, wherein the upper hearing 17 and the lower bearing 18 are each sleeved on one end of an eccentric crankshaft 19. The eccentric crankshaft 19 provides power for the orbiting scroll plate 15 to rotate.

Figure 17:
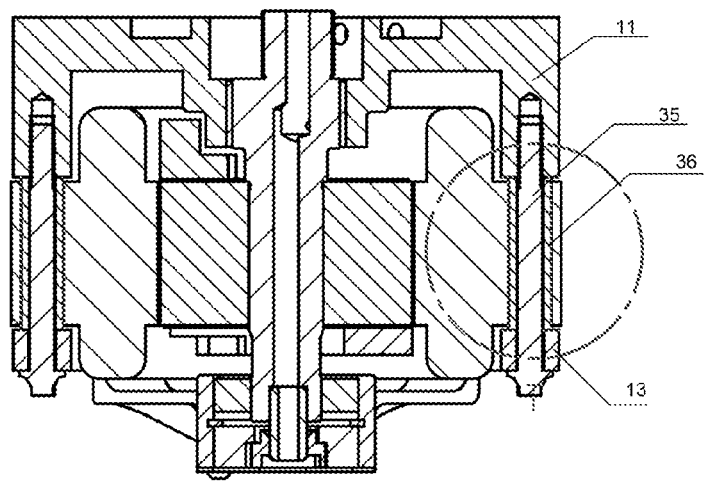
FIG. 17 is a cross-sectional view of the assembly of an upper holder, an electrical machinery mechanism and a lower holder, according to an exemplary embodiment.
Figure 18:
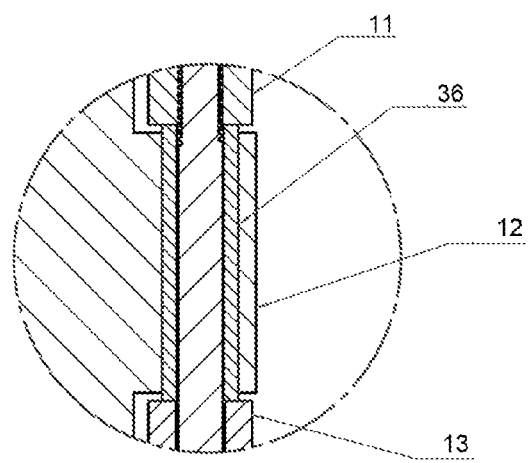
FIG. 18 is a partial view T of FIG. 17.

Furthermore, referring to FIGS. 17 and 18, FIG. 17 is a cross-sectional view of the assembly of an upper holder, an electrical machinery mechanism and a lower holder according to another exemplary embodiment, and FIG. 18 is a partial view T of the assembly in FIG. 17. The compressor, in sonic embodiments, further includes guide pillars 36. Each of the bolts 35 goes through a guide pillar 36, which allows the guiding pillar 36 located between an inner wall of the first bolt-through holes of the stator 12 and the bolt 35. Interference fit is caused between the guide pillars 36 and the first bolt-through hole, wherein the guide pillars 36 includes an end abutting the upper holder 11 and the other end abutting the lower holder 13. In this way, axiality errors between shaft-hearing holes in the upper holder and the lower holder, induced by parallelism errors between end planes of the stator 12, or by flatness errors of the end planes of the rotor 20, are then eliminated. Thus, the assembling precision of the upper and lower hearings is improved, which increases the efficiency of the compressor. The axial length of the guide pillars 36, in some embodiments, is greater than the axial length of the first bolt-through holes. In some embodiments, the guide pillars 36 neatly abut the upper holder and the lower holder, and a distance is created between the stator 12 and the upper and lower holders.

Figure 19:
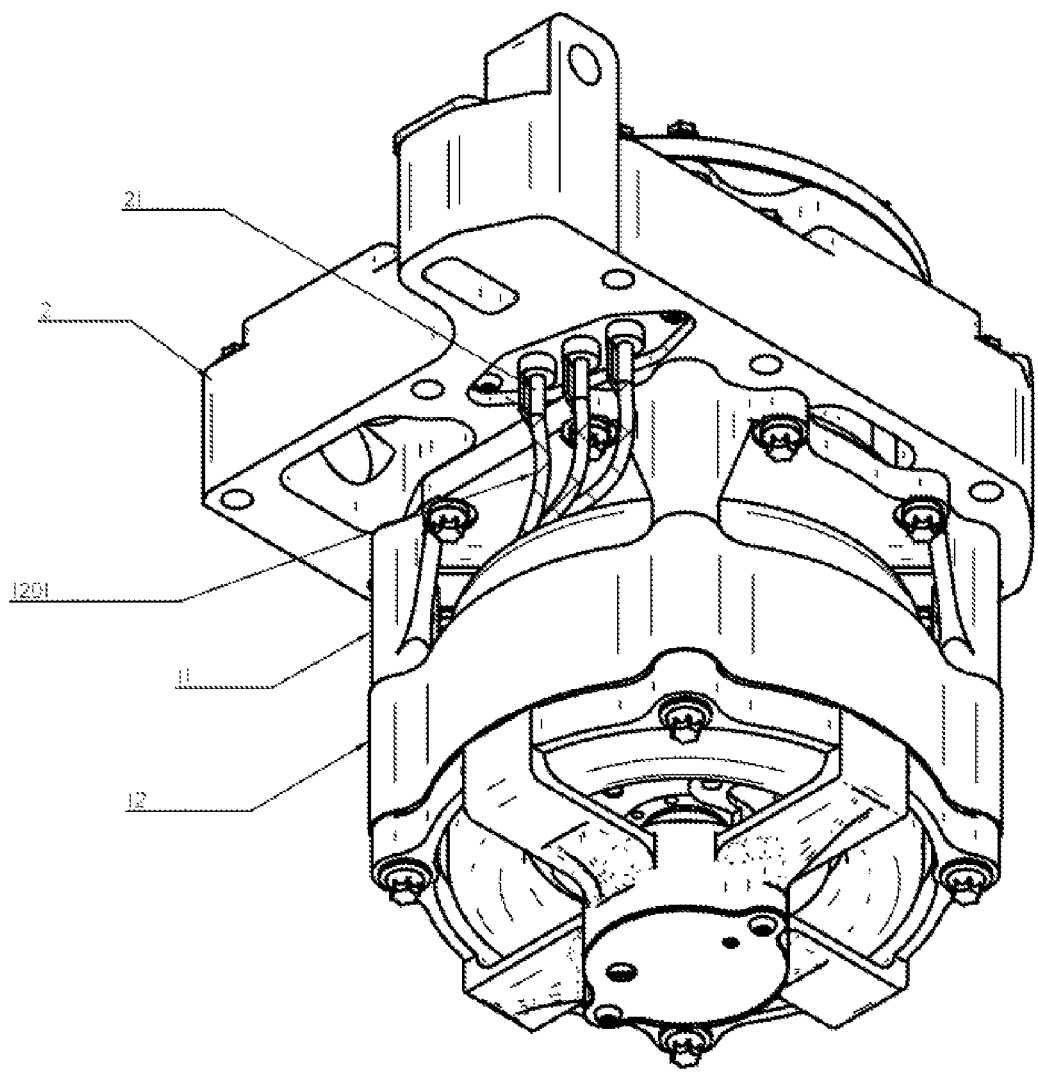
FIG. 19 is a three-dimensional view of components, located in compressor housing, according to another exemplary embodiment.
Figure 20:
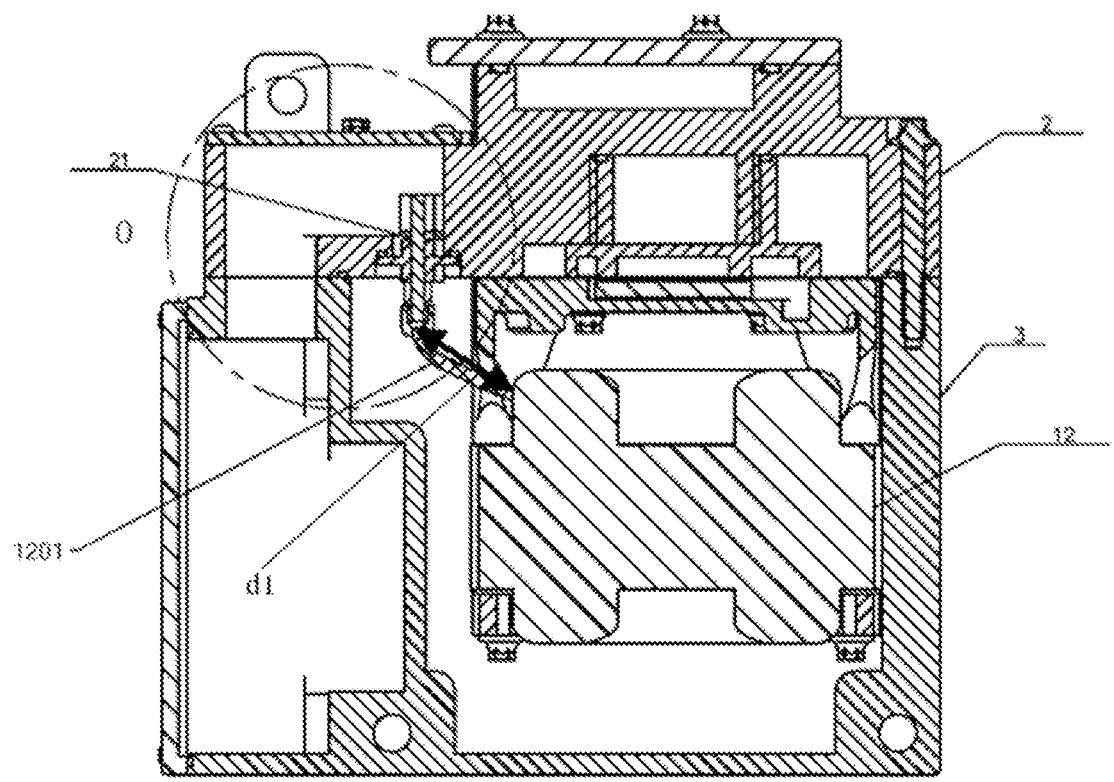
FIG. 20 is a cross-sectional view of a compressor, according to another exemplary embodiment.
Figure 21:
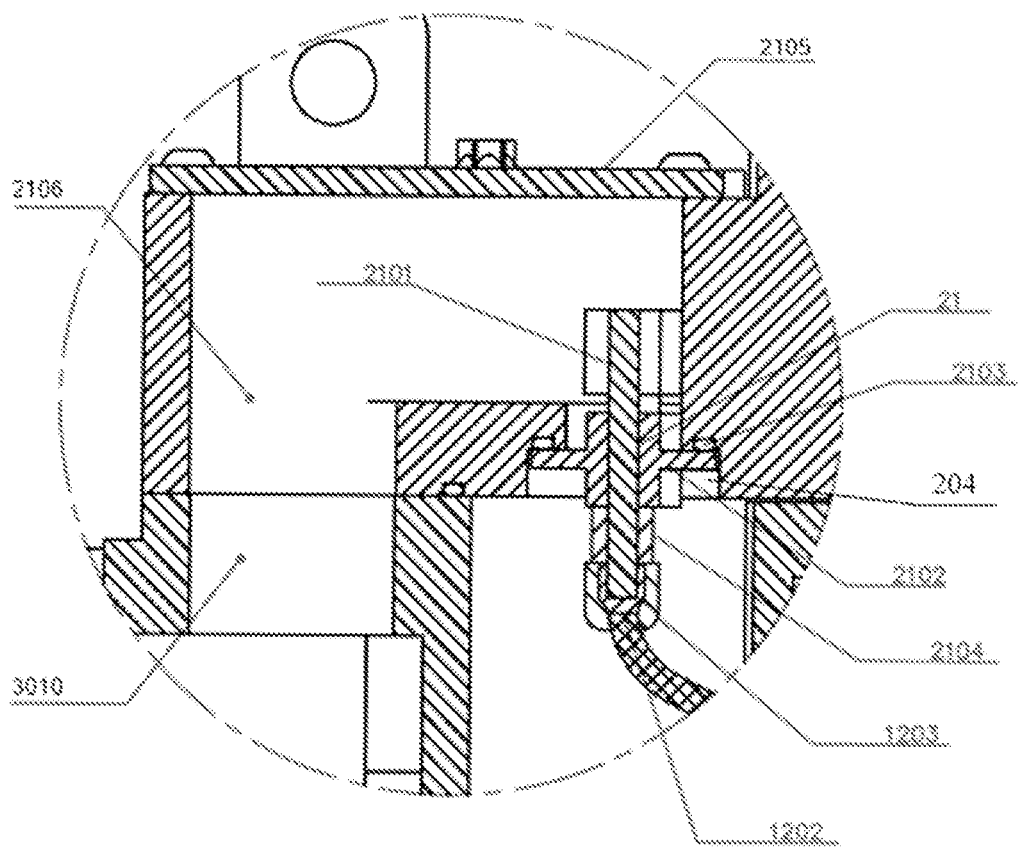
FIG. 21 is a partial view O of FIG. 20.
Figure 22:
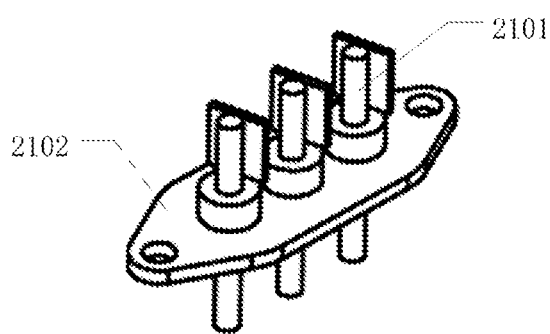
FIG. 22 is a three-dimensional view of a binding post, according to another exemplary embodiment.

Referring to FIGS. 19 to 22, FIGS. 19 to 22 discloses a compressor of another embodiment of the present disclosure. FIG. 19 is a three-dimensional view of components inside a compressor housing, according to another exemplary embodiment. FIG. 20 is a cross-sectional view of a compressor according to another exemplary embodiment. FIG. 21 is a partial view O of FIG. 20. FIG. 22 is a three-dimensional view of a binding post, according to another exemplary embodiment.

In this embodiment, the compressor is similar to the compressor in the previous embodiments. The compressor, in this embodiment, includes a housing 3, a compression mechanism and an electrical machinery mechanism. The housing 3 includes a first opening. The compression mechanism includes a fixed scroll plate 2 and an orbiting scroll plate 15. A receiving space is formed between a low-pressure side 202 of the fixed scroll plate 2 and the first opening of the housing 3, since the low-pressure side 202 of the fixed scroll plate 2 is faced to the first opening of the housing 3. The electrical machinery mechanism includes a rotor and a stator 12, located inside the receiving space, wherein the stator 12 is connected and fixed to the fixed scroll plate 2 via an upper holder 11.

In this embodiment, the stator 12 is coupled to a binding post 21 by lead-out wires, and then coupled to electric controlling components in a controller chamber 302 via a static-vortex-plate wiring through hole 2106 and a housing wiring through hole 3010. The binding post 21, disposed between the inner wall of the housing 3 and the outer wall of the stator 12, is located away form an oil pool 31. Thus, the binding post 21 is located near the top of the receiving space formed between the housing 3 and the fixed scroll plate 2. In some embodiments, each binding post includes a pin 2101 and an end plate 2102. The end plate 2102 includes a through hole which allows the pin 2101 to go through. Each of lead-out wires 1201 includes a terminal 1202 electrically coupled to a pin 2101 and an insulation cover 1203 covering external of the terminal 1202. Pins 2101, located between the insulation cover 1203 and the end plate 2102, are surrounded by insulation sleeves 2104. The internal diameter of each insulation sleeve 2104 is smaller than the diameter of each pin 2101. The binding post 21, in some embodiments, is disposed on the fixed scroll plate 2. In some embodiments, the fixed scroll plate 2 includes through holes which allows the pins 2101 of the binding post 21 to go through and a groove 204, facing an opening of the motor mechanism, surrounding the through hole. The through hole allows the pins 2101 of the binding post 21 of the fixed scroll plate 2 to go through. The end plate 2102, away from a surface of the electrical machinery mechanism, is contacted with a bottom wall of the groove 204. A wiring cover plate 2105 covers the end plane of the groove 204 on the back surface of the fixed scroll plate 2, in order to protect the binding post 21 and wires connected to controllers.

In this embodiment, since the stator 12 is connected and fixed to the fixed scroll plate 2 and the binding post 21 is connected and fixed to the fixed scroll plate 2 as well, the positional relationship between the stator 12 and the binding post 21 is fixed. Therefore, a distance d1 between an outlet of the lead-out wires 1201 and the binding post 21 is constant during an assembling process of the binding post 21 and the lead-out wires 1201. The fixed scroll plate 2 and the housing 3 are yet to be assembled, which provides sufficient operating room for assembling the lead-out wires 1201 and the binding post 21. Lead-out wires 1201 with suitable length, e.g. the length of the lead-out wire being exactly enough to bind the terminals 1202 to the pins 2101 of the binding post 21, provides a short redundant length of lead-out wires 1201. Each of the pins 2101 is sleeved with insulation sleeves 2104 before the terminals 1202 are bound to the binding post 21. The internal diameter of each insulation sleeve 2104 is less than the diameter of each pin 2101 such that the inner hole of the insulation sleeve 2104 is tightly fit the external surface of the pin 2101. Terminals 1201 are then installed on pins 2101, and the insulation covers 1203 are tightly pressed which causes elastic deformation of the insulation sleeves 2104. The insulation covers 1203 are tightly fit the insulation sleeves 2104, and the insulation sleeves 2104 are tightly fit the end plate 2102. The assembly of the lead-out wires 1201 and the binding post 21 is accomplished. Then, the fixed scroll plate 2 and the housing 3 are connected and fixed with bolts, to form a closed chamber.

The fixed scroll plate 2 is a portion of the housing of the compressor, and the binding post 21 is installed on the inner side of the fixed scroll plate 2. The stator 12 is indirectly installed on the fixed scroll plate 2 via the upper holder 11. This installing method ensures that the positional installation relationship of the lead-out wires 1201 and the binding post 21 are determined before the closed chamber is formed by the fixed scroll plate 2 and the housing 3. The positional installation relationship of the lead-out wires 1201 and the binding post 21 is unchangeable after the closed chamber is formed by the fixed scroll plate 2 and the housing 3. Furthermore, the length of the lead-out wires 1201 is able to be precisely calculated according to the install positions of the lead-out wires 1201 and the binding post 21 before the closed chamber is formed by the fixed scroll plate 2 and the housing 3. Thus, there is no redundant length of the lead-out wires 1201 after the lead-out wires 1201 and the binding hosts 21 being assembled. The lead-out wires 1201 is then properly fixed and the sways, caused by the vibration of the compressor, of the lead-out wires are eliminated. The lead-out wires 1201 have no possibility of touching nearby components or the housing of the compressor, which significantly improves the insulation and reliability of the compressor. Therefore, during the process of designing the housing 3 and parts of the lead-out wires 1201, only required electrical safe gap is reserved, which is good for minimizing compressors.

The installation position of binding post 21 and the lead-out wires 1201 is away from the oil pool, which is located at the top interior portion of the compressor. When liquid refrigerant, including lubricate oil or minor water and impurity, is existed in the compressor, the liquid refrigerant starts to accumulate at the interior bottom of the compressor. Therefore, the joint of the binding post 21 and the lead-out wires 1201 has fewer possibilities to be soaked in the liquid refrigerant since the installation position of binding post 21 and the lead-out wires 1201 is located at the top interior portion of the compressor. The insulation of the compressor is then improved.

Moreover, the assembling process of the lead-out wires 1201 and the binding post 21 is performed in an open environment which is outside the housing of the compressor. Therefore, there is sufficient operating space and the assembling process is completely viewable. The convenience of assembling and inspection processes are improved which will reduce the possibilities of error operation and improve production efficiency, Furthermore, since the binding post 21 is installed on the low-pressure side of the fixed scroll plate 2 and the internal pressure in the compressor is greater than external pressure, the pressure difference of the internal pressure and the external pressure is applied on the end plate 2102 and forces the end plate 2102 to tightly abut the internal groove wall of the fixed scroll plate 2. Sealing parts 2103 of the binding post 21 provide ideal sealing between the binding post 21 and the low-pressure side of the fixed scroll plate 21 without applying too much pressure on the end plate 2102. Therefore, compared with the installation of installing the binding post 21 on the external side of the compressor, when the binding post 21 is installed on the low-pressure side of the fixed scroll plate 2, force condition of the binding post 21 and the sealing parts 2103 is better. The strength requirements of the binding post 21 and the sealing parts 2103 are not so strict, which helps weight reduction and cost reduction for related components.

Additionally, insulation protective device is added to the joint of the lead-out wires 1201 and the binding post 21. In some embodiments, insulation covers 1203 are disposed outside terminals 1202 of lead-out wires 1202. In some embodiments, insulation sleeves 2104 are disposed outside the pins 2101 and are between the insulation covers 1203 and the end plate 2102. The insulation protective devices are used to further reduce the possibility of the electrically conductive parts of the lead-out wires 1201 and the binding post 21 getting exposed in an environment where refrigerant, lubricant oil and possible, relatively water and impurity, which improves the insulation of the compressor.

Similarly, in some embodiments, the compressor further includes a housing cover. A receiving space is formed between the housing cover and the housing body. The binding post is disposed on the housing cover. Correspondingly, the housing cover includes through holes which allows the pins to go through and a groove facing towards to an opening of the electrical machinery mechanism. The groove surrounds the through holes, allowing the pins to go through, on the housing cover. The end plate, away from the surface of the electrical machinery mechanism, contacts the bottom wall of the groove. All the varieties are incorporated in the scope of the present disclosure.

In some embodiments, the mentioned embodiments describe the fixed scroll plate which is used to be a component for connecting the stator and the binding post. In some embodiments, the housing cover serves as a component for connecting the stator and the binding post, wherein the receiving space is formed between the housing cover and the housing body. All the varieties are incorporated in the scope of the present disclosure.

Compared with the current technology, the present disclosure has the following advantages, 1) The positional installation relationship of the lead-out wires 1201 and the binding post 21 are determined before the closed chamber is formed by the fixed scroll plate 2 and the housing 3. There is no redundant length of the lead-out wires 1201 after the lead-out wires 1201 and the binding hosts 21 being assembled. The lead-out wires 1201 is then properly fixed and the sways, caused by the vibration of the compressor, of the lead-out wires are eliminated. The reliability and insulation of the compressor are improved.

2) Since the installation positions of the binding post and lead-out wires is away from the bottom wall of the housing and the oil sump, the joints of the binding post and the lead-out wires are less possible to be soaked into the liquid refrigerant. Thus, the insulation of the compressor is improved.

3) Meanwhile, since the assembling process of the lead-out wires 1201 and the binding post 21 is performed in an open environment before the closed chamber is formed by the fixed scroll plate 2 and the housing 3. Therefore, there is sufficient operating space.

It will be appreciated that the present disclosure is not limited to the exact construction that has been described above and illustrated in the accompanying drawings, and that various modifications and changes can be made without departing from the scope thereof. It is intended that the scope of the disclosure only be limited by the appended claims.

It will be appreciated that the present disclosure is not limited to the exact construction that has been described above and illustrated in the accompanying drawings, and that various modifications and changes can be made without departing from the scope thereof. It is intended that the scope of the disclosure only be limited by the appended claims.

The invention claimed is:

1. A scroll compressor for vehicles, comprising:
a housing cover;
a housing including a first opening to form a receiving space;
a compressing mechanism, wherein the compressing mechanism comprises a fixed scroll plate and an orbiting scroll plate;
an electrical machinery mechanism including a rotor and a stator, wherein the electrical machinery mechanism, located in the receiving space, drives the compressing mechanism to rotate;
an upper holder fixed to the housing cover; and
a lower holder being fixed to the upper holder via the stator;
wherein the stator is coupled to a binding post by lead-out wires, and the binding post, away from a bottom wall of the housing, is located between an inner wall of the housing and an outer wall of the stator, the binding post is located on the housing cover, wherein the stator and the binding post are installed to a component formed by the housing cover and the upper holder, and a distance between an outlet of the lead-out wires and the binding post is constant during an assembling process of the binding post and the lead-out wires;
wherein the binding post is installed with and coupled to the lead-out wires of stator before a closed cavity is formed between the housing and the housing cover, the binding post comprises pins and an end plate with through holes, the pins pass through the through holes; a length of the lead-out wires is just enough for connecting the pins of the binding post to terminals of the lead-out wires
wherein, the fixed scroll plate comprises a low-pressure side of scroll wraps and a high-pressure side, opposite to the scroll wraps, wherein the low pressure side of the fixed scroll plate is facing to the first opening of the housing to form the receiving space; the orbiting scroll plate is located in the receiving space, and comprises a side, facing the scroll wraps of the fixed scroll plate, of scroll wraps, wherein a compression chamber is formed between the scroll wraps of the fixed scroll plate and the scroll wraps of the orbiting scroll plate;
wherein, the housing cover faces the first opening of the housing to form the receiving space; the housing cover comprises at least one through hole for the pins of the binding post to pass through and a groove, wherein the groove surrounds the at least one through hole in the housing cover, and the groove faces an opening of the electrical machinery mechanism; and a surface of the end plate, away from a surface of the electrical machinery mechanism, is contacted with a bottom wall of the groove.

2. The scroll compressor for vehicles of claim 1, wherein the lead-out wires comprise terminals, electrically coupled to the pin, and an insulation cover;
wherein the pins, located between the insulation cover and the end plate, are surrounded by insulation sleeves.

3. The scroll compressor for vehicles of claim 2, wherein the internal diameter of the insulation sleeves is less than the outer diameter of the pin.

4. The scroll compressor for vehicles of claim 1, wherein,
the upper holder comprises a first side, fixed to the fixed scroll plate, a second side, being opposite to the first side, and a plurality of upper-holder bosses disposed on the second side of the upper holder, wherein each of the upper-holder bosses includes a threaded hole;
the stator includes a plurality of first bolt-through holes corresponding to the threaded holes;
the lower holder includes a plurality of second bolt-through holes corresponding to the threaded holes; and
a plurality of bolts being respectively through the second bolt-through holes, the first bolt-through holes and the threaded holes for fixing the upper holder, the stator and the lower holder.

5. The scroll compressor for vehicles of claim 4, wherein the scroll compressor further comprises:
a plurality of guide pillars each respectively including an axial through hole, wherein one of the plurality of bolts goes through each guide pillar, and the guide pillars are located between the bolts and an inner wall of the first bolt-through holes of the stator;
wherein a terminal of the guide pillars abuts the upper holder, and the other terminal of the guide pillars abuts the lower holder.

6. The scroll compressor for vehicles of claim 5, wherein an axial length of the guide pillars are greater than an axial length of the first bolt-through hole.

7. The scroll compressor for vehicles of claim 4, wherein each of the plurality of bolts are through the upper holder and screwed in the threaded holes of the fixed scroll plate to fix the upper holder and the low-pressure side of the fixed scroll plate.

8. A scroll compressor for vehicles of claim 1, wherein the housing comprises a retaining wall which divides the receiving space to a low-pressure chamber and a controller chamber, wherein the electrical machinery mechanism is disposed in the low-pressure chamber.

9. The scroll compressor for vehicles of claim 8, wherein the controller chamber includes a second opening, and the scroll compressor further comprises:
a controller-chamber cover for sealing the second opening; and at least one electric controlling component disposed in the controller chamber located between the controller-chamber cover and the retaining wall.

10. The scroll compressor for vehicles of claim 9, wherein the retaining wall includes a reentrant facing an opening of the controller chamber; and the electric controlling components include:
a first electric controlling component disposed in the reentrant; and
a second electric controlling component being patched with a portion of the retaining wall, wherein the portion of the retaining wall is located outside of the reentrant.

11. The scroll compressor for vehicles of claim 10, wherein the first electric controlling component includes at least one of capacitors, inductors and relays, and the second controlling component includes power components contacted with the retaining wall.

12. A scroll compressor for vehicles, comprising:
a housing including a first opening to form a receiving space;
a compressing mechanism, wherein the compressing mechanism comprises a fixed scroll plate and an orbiting scroll plate, the fixed scroll plate comprises a low-pressure side of scroll wraps and a high-pressure side, opposite to the scroll wraps;
an electrical machinery mechanism including a rotor and a stator, wherein the electrical machinery mechanism, located in the receiving space, drives the compressing mechanism to rotate;
an upper holder fixed to the low-pressure side of the fixed scroll plate; and
a lower holder being fixed to the upper holder via the stator;
wherein the stator is coupled to a binding post by lead-out wires, and the binding post, away from a bottom wall of the housing, is located between an inner wall of the housing and an outer wall of the stator, the binding post is located on the fixed scroll plate, wherein the stator and the binding post are installed to the fixed scroll plate, and a distance between an outlet of the lead-out wires and the binding post is constant during an assembling process of the binding post and the lead-out wires;
wherein the binding post is installed with and coupled to the lead-out wires of stator before a closed cavity is formed between the housing and the fixed scroll plate, the binding post comprises pins and an end plate with through holes, the pins pass through the through holes; a length of the lead-out wires is just enough for connecting the pins of the binding post to terminals of the lead-out wires;
wherein, the low-pressure side of the fixed scroll plate is facing to the first opening of the housing to form the receiving space; the orbiting scroll plate is located in the receiving space, and comprises a side, facing the scroll wraps of the fixed scroll plate, of scroll wraps, wherein a compression chamber is formed between the scroll wraps of the fixed scroll plate and the scroll wraps of the orbiting scroll plate; the fixed scroll plate comprises at least one through hole which allows the pin of the binding post to go through and a groove surrounded the through hole, in the fixed scroll plate, and the groove is facing toward to an opening of the electrical machinery mechanism; a surface of the end plate, away from a surface of the electrical machinery mechanism, is contacted with a bottom wall of the groove.

\* \* \* \* \*